(12) United States Patent
Tanaka et al.

(10) Patent No.: US 8,463,886 B2
(45) Date of Patent: Jun. 11, 2013

(54) METHOD AND APPARATUS FOR DISTRIBUTED COMPUTING, AND COMPUTER PRODUCT

(75) Inventors: Yuuta Tanaka, Kawasaki (JP); Toshiyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 11/166,998

(22) Filed: Jun. 24, 2005

(65) Prior Publication Data

US 2006/0195608 A1 Aug. 31, 2006

(30) Foreign Application Priority Data

Feb. 25, 2005 (JP) ................................. 2005-051675

(51) Int. Cl.
*G06F 15/173* (2006.01)
(52) U.S. Cl.
USPC ............ 709/223; 709/230; 709/238; 718/100
(58) Field of Classification Search
USPC .................. 709/226, 223, 230, 238; 718/100
See application file for complete search history.

(56) References Cited

U.S. PATENT DOCUMENTS

| | | | |
|---|---|---|---|
| 2001/0052016 A1* | 12/2001 | Skene et al. | 709/226 |
| 2002/0026502 A1* | 2/2002 | Phillips et al. | 709/219 |
| 2003/0026254 A1* | 2/2003 | Sim | 370/392 |
| 2003/0217172 A1* | 11/2003 | Valenci et al. | 709/233 |
| 2004/0192354 A1 | 9/2004 | Sawano | |
| 2004/0255304 A1* | 12/2004 | Ishikawa et al. | 719/318 |
| 2005/0060506 A1* | 3/2005 | Higaki et al. | 711/162 |
| 2005/0188087 A1 | 8/2005 | Iyoda | |

FOREIGN PATENT DOCUMENTS

| | | |
|---|---|---|
| JP | 1994-332873 A | 12/1994 |
| JP | 1995-325806 A | 12/1995 |
| JP | 1998-240697 A | 9/1998 |
| JP | 2000-242614 | 9/2000 |
| JP | 2004-062686 A | 2/2004 |
| JP | 2004-102931 A | 4/2004 |
| JP | 2004-110318 A | 4/2004 |
| JP | 2004-302741 A | 10/2004 |
| JP | 2004-302801 A | 10/2004 |
| JP | 2005-050131 A | 2/2005 |

OTHER PUBLICATIONS

Office Action mailed by Japanese Patent Office on Nov. 17, 2009, in connection with JP 2005-051675. English-language translation provided.
Japanese Office Action mailed Aug. 18, 2009 for Japanese Application No. 2005-051675. A partial English-language translation is provided.
"Japanese Office Action", mailed by JPO and corresponding to Japanese application No. 2010-031753 on Sep. 14, 2010, with English translation.

\* cited by examiner

*Primary Examiner* — Phuoc Nguyen
*Assistant Examiner* — Clarence John
(74) *Attorney, Agent, or Firm* — Fujitsu Patent Center (57) ABSTRACT

A network-segment-determining unit determines network segments including servers to be involved in a distributed processing, based on configuration information stored in a configuration information database (DB). A data dividing unit divides data based on information on the network segments determined by the network-segment-determining unit. A data transfer unit transfers the data divided by the data dividing unit to each of the network segments.

3 Claims, 8 Drawing Sheets

| QUEUE NAME | HOST NAME | NETWORK SEGMENT NAME | EXECUTION MULTIPLICITY |
|---|---|---|---|
| Queue1 | CalcservA1 | Netgrp1 | 4 |
| | CalcservA3 | Netgrp2 | 2 |
| | CalcservA2 | Netgrp1 | 2 |
| | . | . | . |
| | CalcservA10 | Netgrp2 | 4 |
| Queue2 | CalcservB1 | Netgrp3 | 4 |
| | CalcservB2 | Netgrp1 | 2 |
| | CalcservB3 | Netgrp3 | 3 |
| | . | . | . |

FIG.4B

| DEFAULT QUEUE | Queue1 |
|---|---|

| NETWORK SEGMENT NAME | HOST NAME OF DIVIDED-DATA STORAGE | DIRECTORY (MAY BE OMITTED) | MAXIMUM STORAGE CAPACITY (MAY BE OMITTED) | EXECUTION MULTIPLICITY |
|---|---|---|---|---|
| Netgrp1 | CalcservA1 | /tmp | 2048MB | 50 |
| | CalcservA3 | | | |
| | . | . | . | |
| Netgrp2 | CalcservA10 | | | 30 |
| | . | . | . | |
| Netgrp3 | CalcservB1 | /tmp | 512MB | 20 |
| | CalcservB3 | | | |
| | . | . | . | |

METHOD AND APPARATUS FOR DISTRIBUTED COMPUTING, AND COMPUTER PRODUCT

BACKGROUND OF THE INVENTION

1) Field of the Invention

The present invention relates to a technology for efficiently distributing necessary data to each of a plurality of servers involved in a distributed processing.

2) Description of the Related Art

In recent years, technical progress has been made in distributed processing systems, such as a grid computing system, in which a large job is executed in parallel by a large number of computers connected by a network (see, for example, Japanese Patent Application Laid-Open No. 2000-242614). In such systems, data necessary for distributed processing is transmitted to the respective computers or shared by the computers.

However, in the former case, an increase in network load will be brought about. The larger the data is, the more the network load increases. In the latter case, processing can delayed due to network load and server load, since accesses concentrate on a server having the shared data.

SUMMARY OF THE INVENTION

It is an object of the present invention to at least solve the problems in the conventional technology.

An apparatus according to an aspect of the present invention, which is for performing a distributed processing in a network including a plurality of network segments each of which including a plurality of servers, includes: a determining unit that determines network segments including working servers to be involved in the distributed processing from among the servers in the network; and a transmitting unit that transmits data necessary for the distributed processing to each of the network segments determined.

A method according to another aspect of the present invention, which is for performing a distributed processing in a network including a plurality of network segments each of which including a plurality of servers, includes: determining network segments including working servers to be involved in the distributed processing from among the servers in the network; and transmitting data necessary for the distributed processing to each of the network segments determined.

A computer-readable recording medium according to still another aspect of the present invention stores a computer program that causes a computer to execute the above method.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail below with reference to the accompanying drawings.

Figure 1:
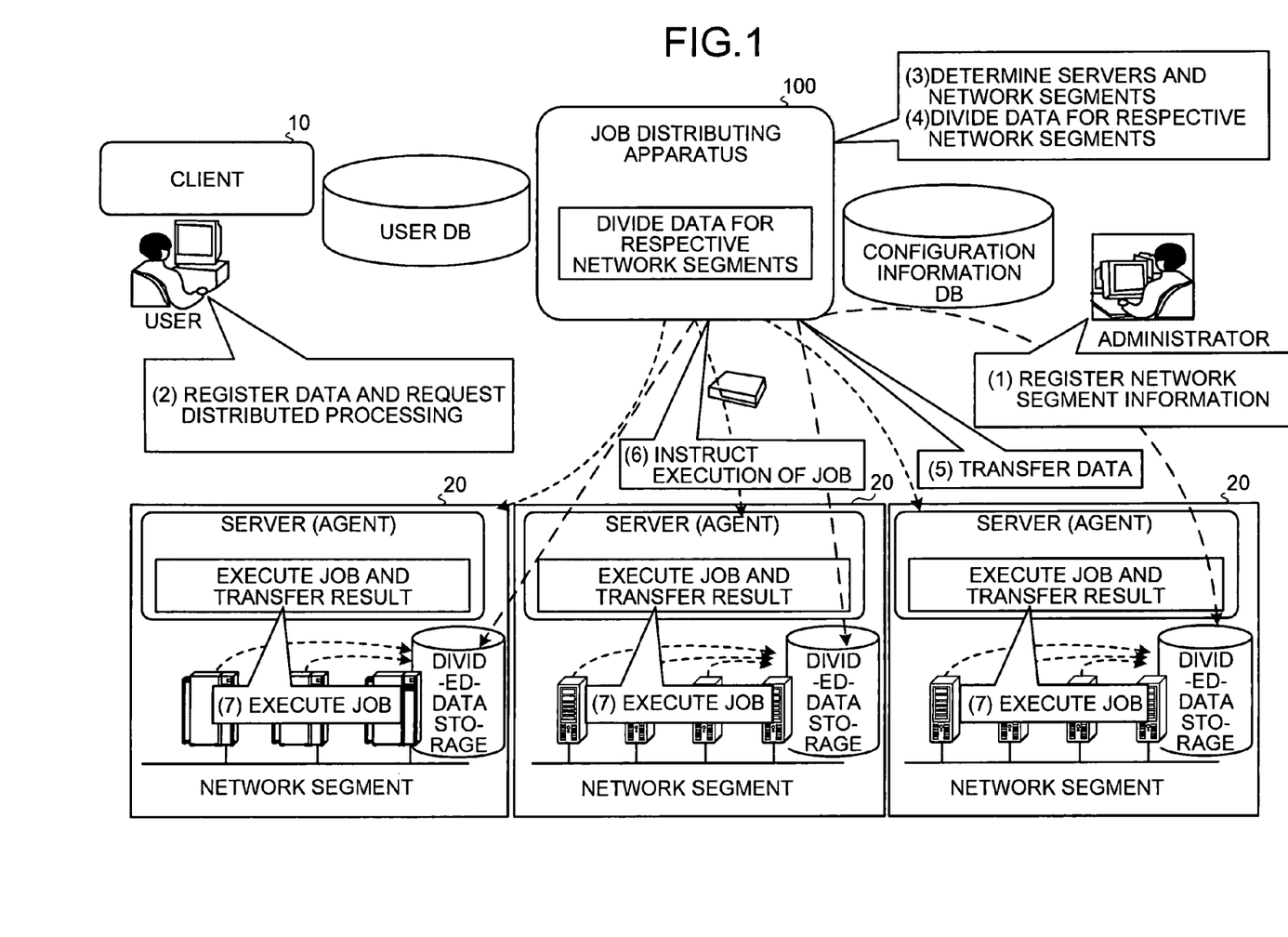
FIG. 1 is an overview of a grid computing system according to an embodiment of the present invention.

FIG. 1 is an overview of a grid computing system according to an embodiment of the present invention. A network is divided into a plurality of network segments 20 in which communication is performed at high speed. Data necessary for distributed processing is arranged in the respective network segments 20.

Figure 2A:
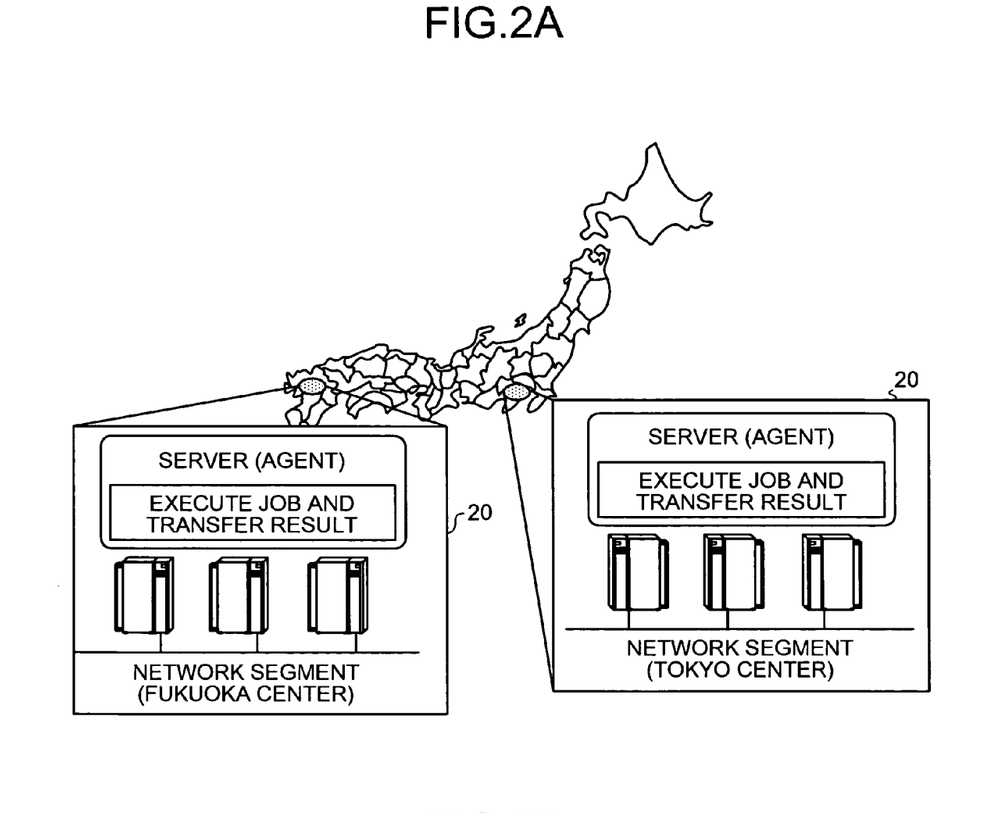
FIGS. 2A and 2B are examples of network segments.
Figure 2B:
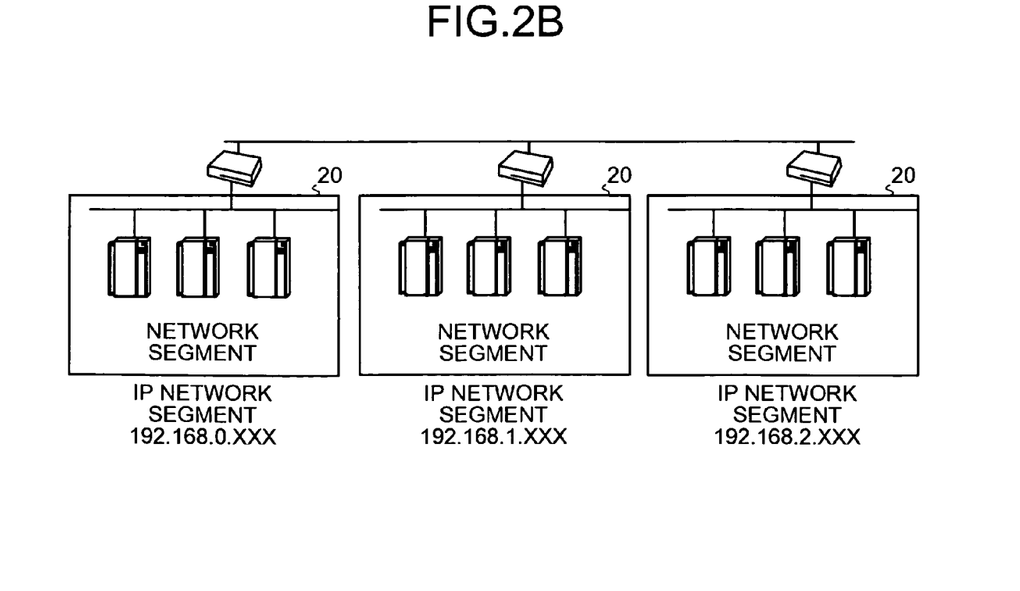

FIGS. 2A and 2B are examples of the network segments 20. FIG. 2A is an example of forming each network segment 20 with servers geographically close to each other. As shown in FIG. 2A, a Fukuoka center and a Tokyo center are shown as the network segments 20. FIG. 2B is an example of grouping servers on the same site into a plurality of network segments 20 (concretely, IP network segments).

As shown in FIG. 1, an administrator of the grid computing system registers information on the network segments 20 in a job distributing apparatus 100 (indicated as (1)). The job distributing apparatus 100 stores the network segment information in a configuration information database (DB).

When a user registers data necessary for a distributed processing and requests execution thereof from a client 10 (indicated as (2)), the job distributing apparatus 100 determines the servers and the network segments 20 to be involved in the distributed processing (indicated as (3)) and divides the data into parts, each of which is for the respective network segments 20 (indicated as (4)).

The job distributing apparatus 100 transfers the respective parts of data to the respective network segments 20 (indicated as (5)) and instructs the respective servers to execute a job (indicated as (6)). The respective servers access the data within the network segments 20 to execute the job and transmit results of the execution to the job distributing apparatus 100 (indicated as (7)).

Thus, in the grid computing according to the present embodiment, data for the distributed processing are arranged in each of the network segments 20, thereby reducing network load compared with the conventional technique for transmitting data to the respective servers.

Moreover, in the grid computing, each server accesses only the data arranged within the network segment 20 to which the server belongs, thereby reducing time for access to the data compared with the conventional technique for accessing shared data stored in one location.

In the present embodiment, the data is divided and arranged in the respective network segments 20. However, it is also possible to arrange the entire data in each of the network segments 20 without dividing the data.

Figure 3:
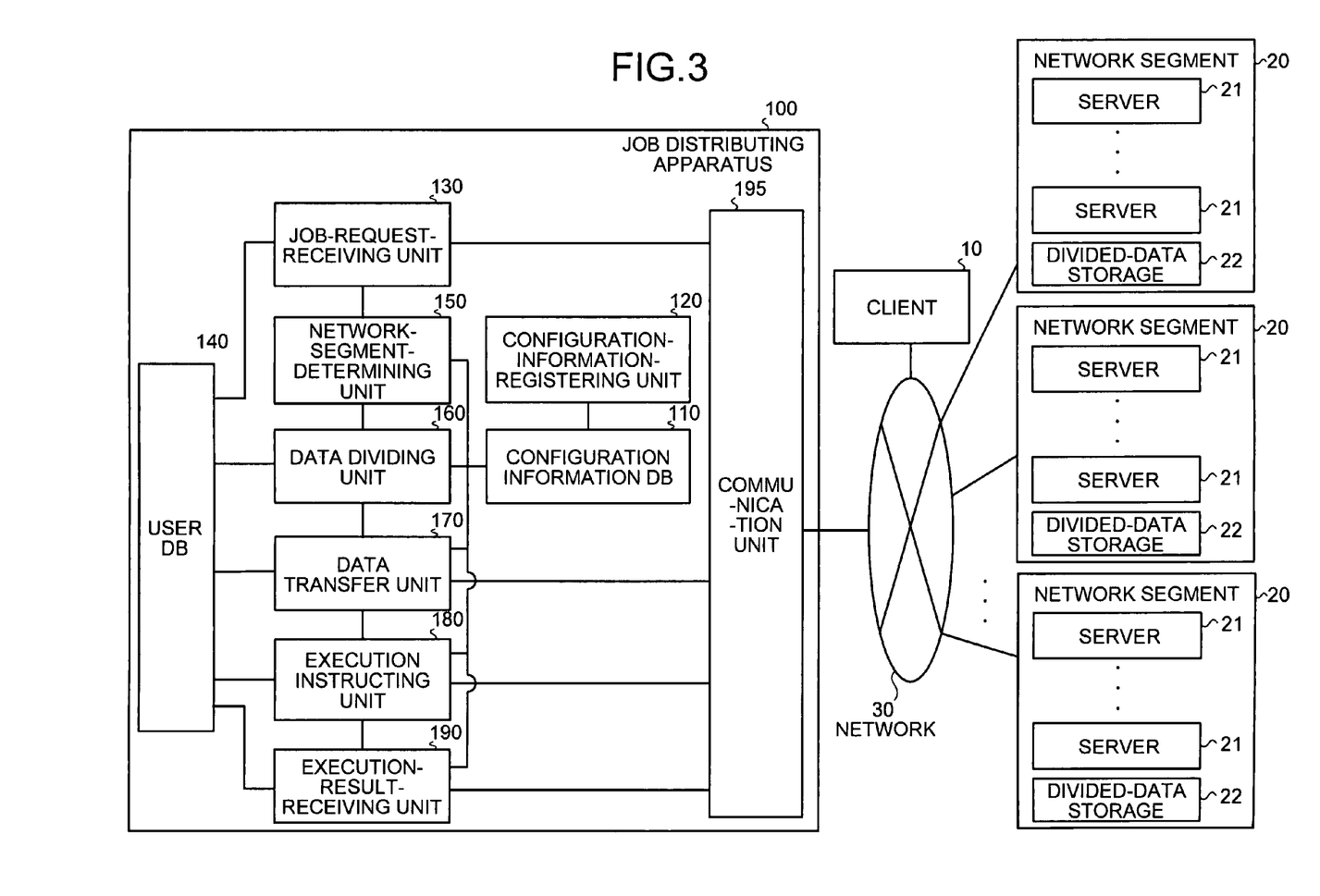
FIG. 3 is a block diagram of the grid computing system.

FIG. 3 is a block diagram of the grid computing system according to the present embodiment. The grid computing system includes the client 10, the network segments 20, and the job distributing apparatus 100, which are connected to a network 30.

The client 10 is a personal computer used by a user. The network segment 20 includes a plurality of servers 21 and a divided-data storage 22 for storing data necessary for execution of the job. In the respective network segments 20, the servers 21 can access the data stored in the divided-data storages 22 at high speed.

For convenience of description, only one client 10 and three network segments 20 are shown in FIG. 3. However, actually, the grid computing system includes a large number of clients 10 and network segments 20.

The job distributing apparatus 100 controls the servers 21 in the network segments 20 to perform distributed processing. The job distributing apparatus 100 includes a configuration information DB 110, a configuration-information-registering unit 120, a job-request-receiving unit 130, a user database (DB) 140, a network-segment-determining unit 150, a data dividing unit 160, a data transfer unit 170, an execution instructing unit 180, an execution-result-receiving unit 190, and a communication unit 195.

Figure 4A:
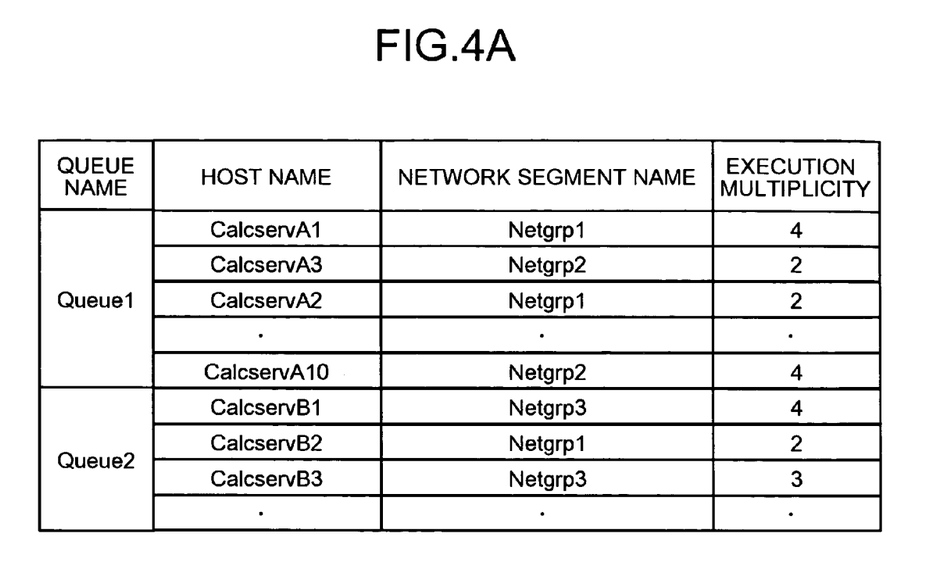
FIGS. 4A to 4C are examples of configuration information stored in a configuration information DB.
Figure 4B:
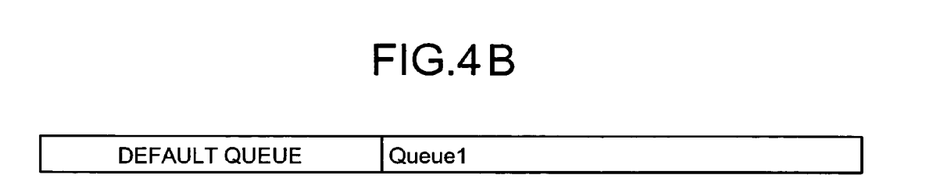
Figure 4C:
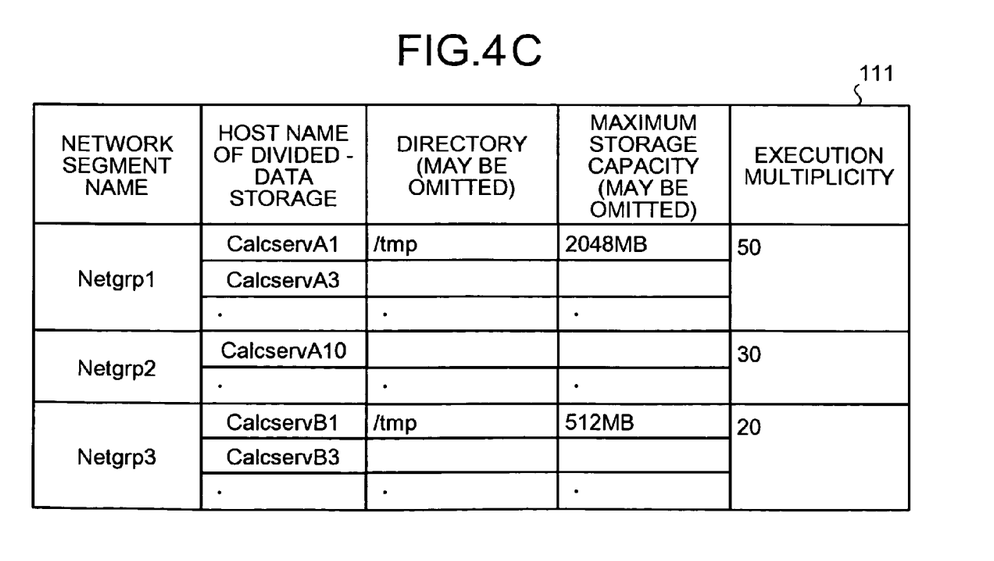

The configuration information DB 110 stores information on the configuration of the grid computing system, such as information on the network segments 20. FIGS. 4A, 4B and 4C are diagrams of an example of the configuration information stored in the configuration information DB 110.

The configuration information includes (a) information on queues and servers, (b) information on a default queue, and (c) information on network segments. The queue means a waiting line for a job requested by a user. The queue can be provided, for example, for each OS running on the servers 21. The user can designate, when requesting distributed processing, to which queue the job is added.

The information on queues and servers shown in FIG. 4A indicates a relation between the queues and the servers 21. The information on queues and servers includes a queue name for identifying a queue, a host name for identifying the servers 21 that execute the job in the queue in parallel, a network segment name for identifying the network segments 20 including the respective servers 21, and an execution multiplicity.

The execution multiplicity is a value indicating a throughput of the server 21, such as the number of jobs executable in parallel. The larger the execution multiplicity, the higher the throughput of the server 21 is. For example, a server "CalcservA1", which executes a job in a queue "Queue1", belongs to a network segment "Netgrp1". The server "CalcservA1" has a throughput twice as large as that of a server "CalcservA3" belonging to a network segment "Netgrp2".

The information on the default queue shown in FIG. 4B indicates which queue is to be used when a user does not designate any queue. In FIG. 4B, "Queue1" is set as the default queue.

The network segment information shown in FIG. 4C includes a network segment name for identifying the network segments 20, a host name of the server 21 functions as the divided-data storage 22 in the respective network segments 20, a directory in which the divided data is stored, a maximum storage capacity of the divided-data storage 22, and an execution multiplicity 111.

The execution multiplicity 111 of the network segment 20 is a sum of execution multiplicities of the servers 21 belonging to the network segment 20. The execution multiplicity 111 represents a throughput of the network segment 20. The job distributing apparatus 100 divides data to be transferred to the network segments 20 based on the execution multiplicity 111.

Referring back to FIG. 3, the configuration-information-registering unit 120 receives configuration information, such as the network segment information, from the administrator and stores the configuration information in the configuration information DB 110.

The job-request-receiving unit 130 receives a job request from the client 10 via a communication unit 195. The job-request-receiving unit 130 stores information on the job request, data necessary for execution of the job, and the like in the user DB 140.

The user data DB 140 stores information on the job request from a user, data necessary for execution of the job, and the like. The user DB 140 stores the job in a plurality of queues.

The network-segment-determining unit 150 determines the network segments 20 to be provided with divided data, based on a queue to which a job has been added. In other words, the network segments 20 including the servers 21, which corresponding to the queue in the information on queues and servers (see FIG. 4A) in the configuration information DB 110, are determined as the network segments 20 to be provided with divided data.

The data dividing unit 160 extracts data from the user DB 140, divides the data into parts that are arranged in the respective network segment 20 determined by the network-segment-determining unit 150, and stores the data in the user DB 140.

The data transfer unit 170 extracts the data divided by the data dividing unit 160 from the user DB 140 and transfers the data to the respective network segments 20 via the communication unit 195. The data transfer unit 170 determines directories in which the divided data are stored with reference to the configuration information DB 110.

The execution instructing unit 180 instructs the servers 21 determined by the network-segment-determining unit 150 to execute the job. The respective servers 21 access the divided-data storages 22 in the network segments 20, to which the respective servers 21 belong, to execute the job according to the instruction from the execution instructing unit 180.

The execution-result-receiving unit 190 receives the result of jobs from the servers 21 and transmits the result to the client 10. The communication unit 195 communicates with the client 10 and the servers 21 via the network 30.

Figure 5:
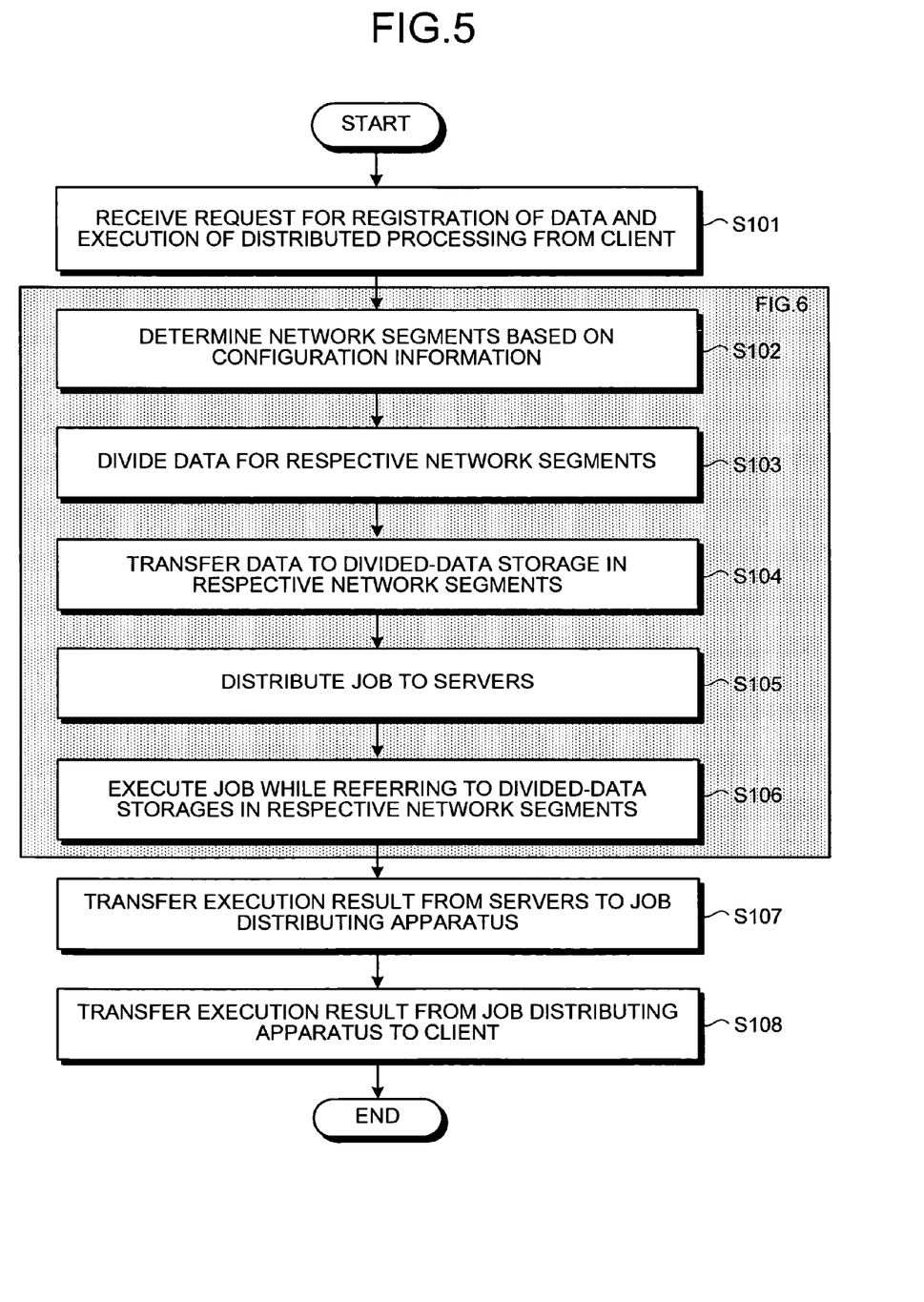
FIG. 5 is a flowchart of a job distribution processing performed by the grid computing system.

FIG. 5 is a flowchart of a job distributing processing performed by the grid computing system according to the present embodiment.

The job distributing apparatus 100 receives a request for registration of data and execution of distributed processing from the client 10 (step S101) and determines the servers 21 and the network segment 20 to be involved by referring to the configuration information DB 110 (step S102).

Then, the job distributing apparatus 100 divides the registered data for the respective network segments 20 (step S103) and transfers the divided data to the divided-data storages 22 in the respective network segments 20 (step S104).

When the job distributing apparatus 100 instructs the respective servers 21 to execute the job (step S105), the respective servers 21 execute the job while referring to the divided-data storages 22 (step S106) and transfer results of the execution to the job distributing apparatus 100 (step S107). The job distributing apparatus 100 collects the results from the respective servers 21 and transmits a result of distributed processing to the client 10 (step S108).

Figure 6:
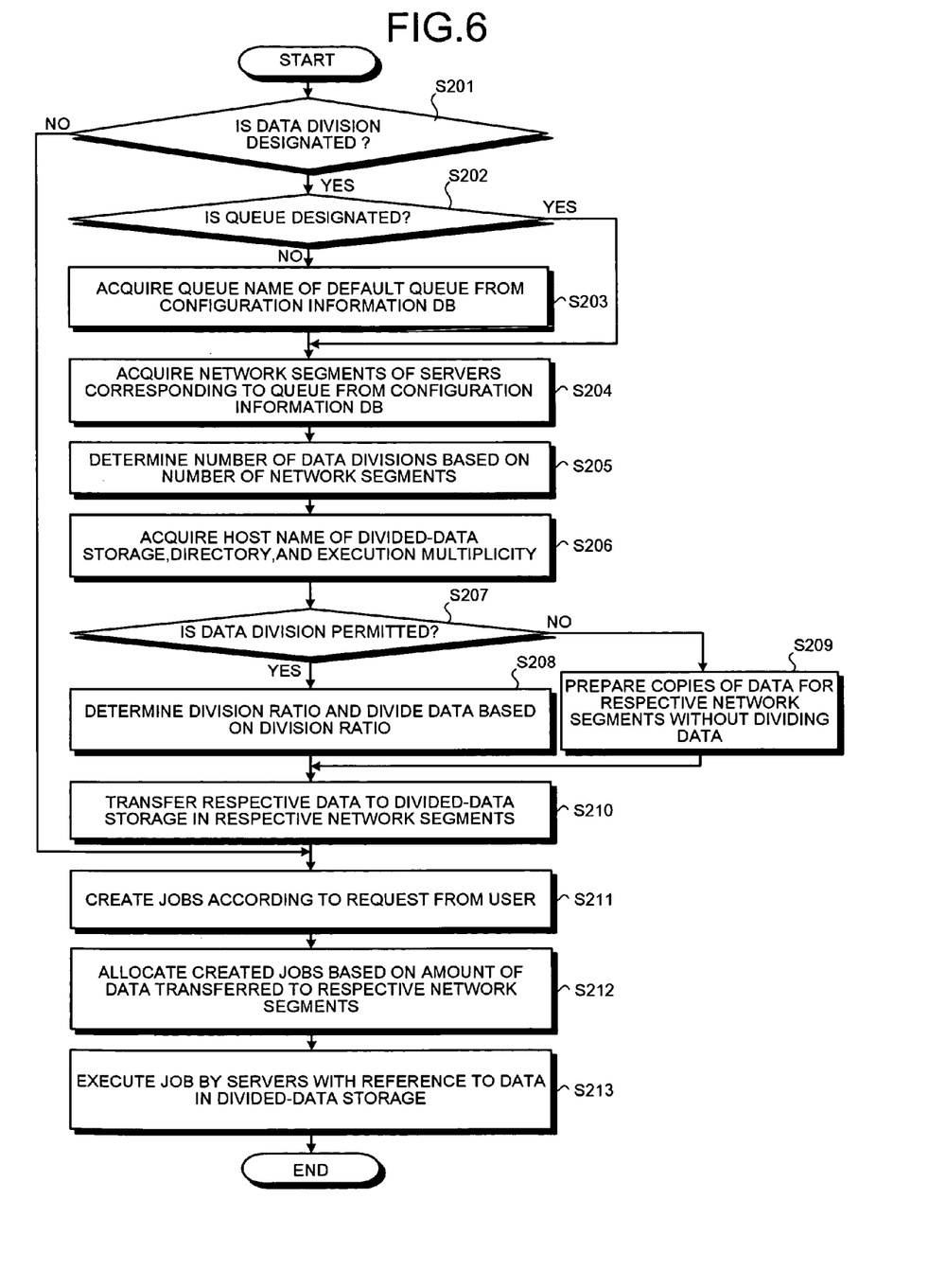
FIG. 6 is a flowchart of details of processing at steps S102 to S106 shown in FIG. 5.

FIG. 6 is a flowchart of the details of the processing at steps S102 to S106 shown in FIG. 5. When the job-request-receiving unit 130 of the job distributing apparatus 100 receives the job request from the user, the network-segment-determining unit 150 determines whether data division is designated (step S201). If data division is not designated (step S201: No), the control proceeds to step S211.

On the other hand, when data division is designated (step S202: Yes), the network-segment-determining unit 150 determines whether the queue is designated (step S202). If the queue is not designated (step S202: No), the network-segment-determining unit 150 acquires the default queue from the configuration information DB 110 as a queue to input the job (step S203).

The network-segment-determining unit 150 acquires the network segments 20 of the servers 21 corresponding to the queue (step S204). For example, when the queue is "Queue1", the network-segment-determining unit 150 acquires network segments 20 "Netgrp1" and "Netgrp2" (see FIG. 4A).

The network-segment-determining unit 150 determines the number of data divisions based on the number of network segments 20 (step S205). For example, when the queue is "Queue1" as described above, the number of data division is "2". In addition, the network-segment-determining unit 150 acquires the host name of divided-data storage, a directory, and the execution multiplicity 111 corresponding to the network segment name (step S206). For example, when the network segment name is "Neggrp1", the network-segment-determining unit 150 acquires the host name of divided-data storage "CalcservA1", a directory "/tmp", and the execution multiplicity 111 "50" (see FIG. 4C).

Then, the data dividing unit 160 determines whether data division is permitted by referring to a definition input from a user (step S207). For example, the user can designate propriety of division, the possible number of divisions, dividing tools, and the like.

When the division is permitted (step S207: Yes), the data dividing unit 160 compares the execution multiplicities 111 to determine a ratio of data division and divides the data based on the ratio (step S208). On the other hand, when the division is not permitted (step S207: No), the data dividing unit 160 prepares copies of data for respective network segments 20 (step S209).

In the above example, the data is divided based on the ratio "50:30", since the ratio of the execution multiplicities 111 is "50:30" in the network segments "Netgrp1" and "Netgrp2". However, when the possible number of divisions is set, data division is performed based on a ratio closest to the ratio under limitation of the possible number of divisions. For example, when the possible number of divisions is two (in other words, when the data can be divided into two at the most), the data is divided based on a ratio of "1:1" even if the ratio of the execution multiplicities 111 is "50:30".

Then, the data transfer unit 170 transfers respective data to the divided-data storage 22 in the respective network segments 20 (step S210). The execution instructing unit 180 creates jobs according to a request from the user (step S211) and allocates the created jobs to the respective network segments 20 based on the amount of data transferred to the network segment 20. The execution instructing unit 180 provides the servers 21 with the host name and the directory of the divided-data storage 22 in the network segments 20 through parameters (step S212).

Then, according to an execution instruction from the execution instructing unit 180, the servers 21 executes the job with reference to the divided data in the divided-data storages 22 (step S213).

Thus, the data dividing unit 160 divides data based on the execution multiplicity 111. Consequently, it is possible to divide data appropriately according to throughputs of the network segments 20.

Figure 7:
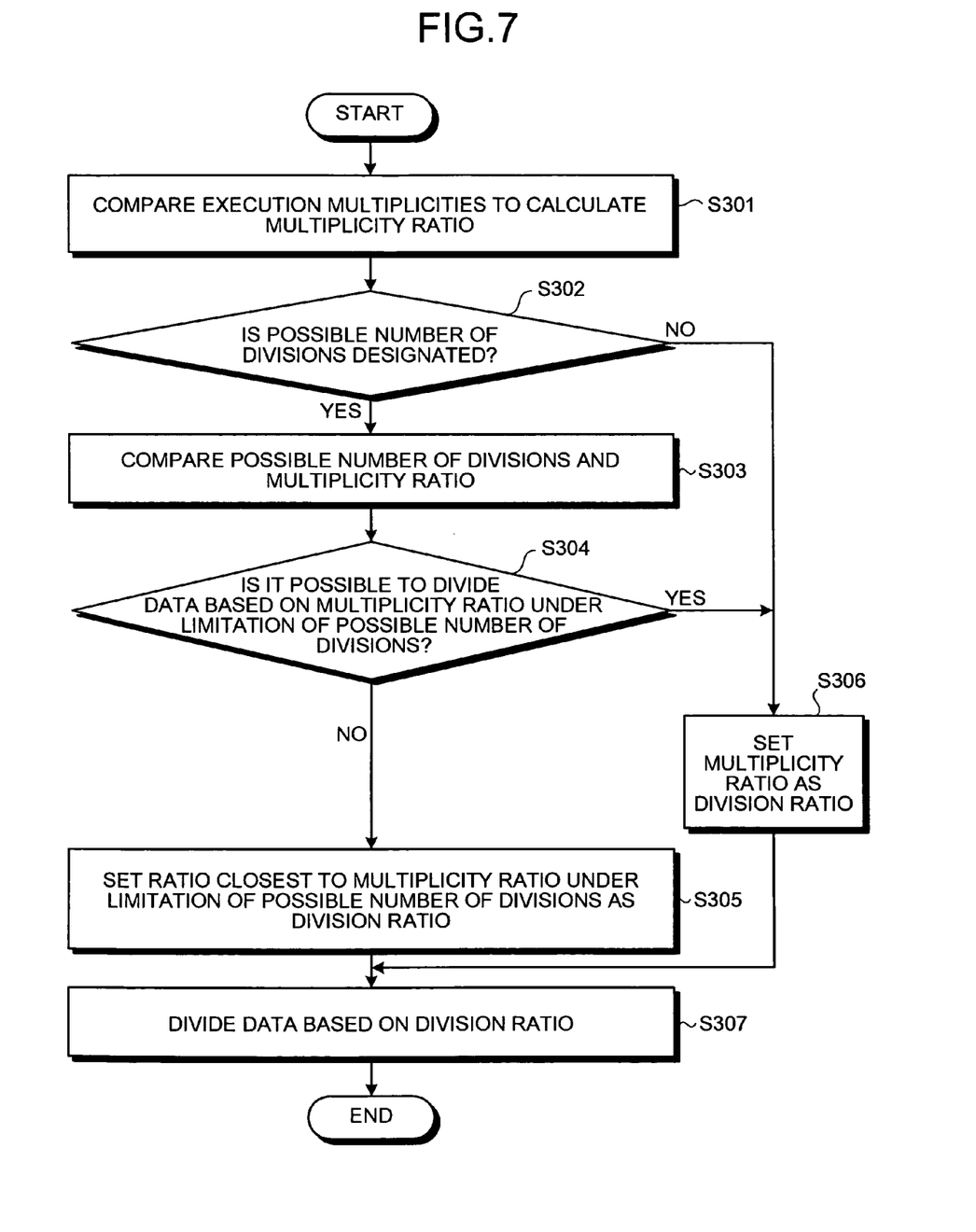
FIG. 7 is a flowchart of the details of data dividing processing at step S208 shown in FIG. 6.

FIG. 7 is a flowchart of the details of the data dividing processing at step S208 shown in FIG. 6. The data dividing unit 160 compares the respective execution multiplicities 111, which are acquired in the previous processing (that is, the processing at step S206 in FIG. 6), to calculate the multiplicity ratio (step S301).

The data dividing unit 160 determines whether the possible number of divisions is designated by the user (step S302). If the possible number of divisions is not designated (step S302: No), the data dividing unit 160 sets the multiplicity ratio as a division ratio (step S306) and divides the data based on the division ratio (step S307).

On the other hand, when the possible number of divisions is designated (step S302: Yes), the data dividing unit 160 compares the designated possible number of divisions and the multiplicity ratio (step S303) and determines whether it is possible to divide the data by the multiplicity ratio under the limitation of the designated possible number of divisions (step S304). In the above example, the data can be divided by the multiplicity ratio (that is, "50:30=5:3") when the possible number of divisions is a multiple of "8".

If the data can be divided by the multiplicity ratio (step S304: Yes), the data dividing unit 160 sets the multiplicity ratio as the division ratio (step S306) and divides the data based on the division ratio (step S307).

On the other hand, when the data cannot be divided by the multiplicity ratio due to the designated possible number of divisions (step S304: No), the data dividing unit 160 sets a ratio closest to the multiplicity ratio under the limitation of the possible number of divisions as a division ratio (step S305) and divides the data based on the division ratio (step S307).

Specifically, when the multiplicity ratio of a network segment A and a network segment B is X:Y, the amount of data $N_A$ for the network segment A is calculated as $N_A = X/(X+Y) \times$ possible number of data divisions. When there are decimals, $N_A$ is rounded off to calculate an approximate value of the multiplicity ratio to be set as the division ratio. Consequently, it is possible to divide the data appropriately according to throughputs of the network segments 20 in a range designated by the user.

Figure 8:
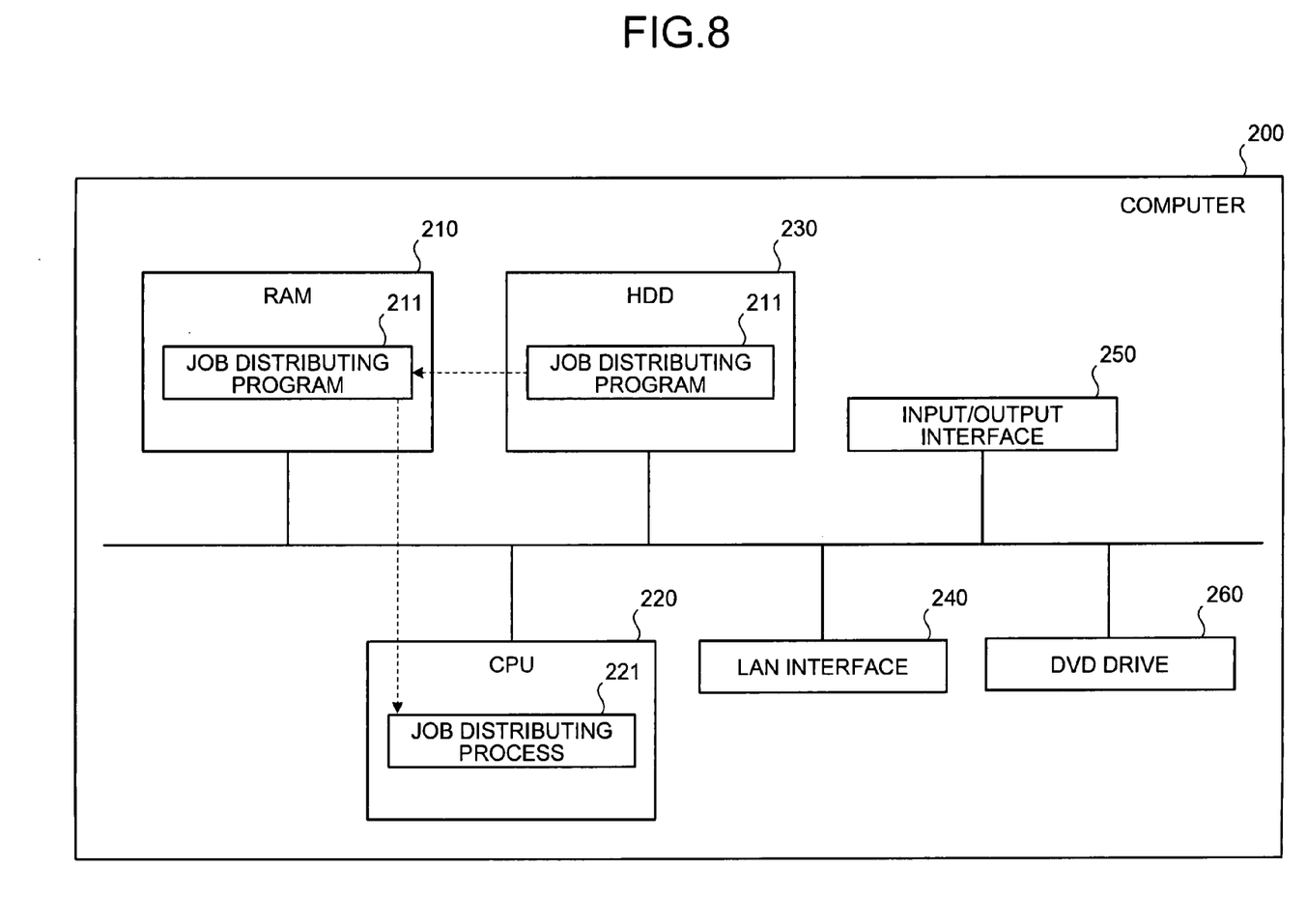
FIG. 8 is a block diagram of a computer executing a job distributing program according to the embodiment of the present invention.

The job distributing apparatus 100 can be realized by software. FIG. 8 is a block diagram of a computer executing a job distributing program according to the present embodiment. A computer 200 includes: a random access memory (RAM) 210 for storing a program, an execution result of the program, and the like; a central processing unit (CPU) 220 that reads out and executes the program; a hard disk drive (HDD) 230 for storing a program and data; a local area network (LAN) interface 240 for connecting the computer 200 to other computers (such as the client 10 and the servers 21) through a LAN; an input/output interface 250 for connecting input devices (such as a mouse and a keyboard) and a display device to the computer 200; and a digital versatile disk (DVD) drive 260 that reads data from and writes data in a DVD.

A job distributing program 211, which is executed in the computer 200, is stored in the DVD, read out from the DVD by the DVD drive 260, and installed in the computer 200. Alternatively, the job distributing program 211 is stored in databases of other computer systems connected to the computer 200 via the LAN interface 240, read out from the databases, and installed in the computer 200. Then, the installed job distributing program 211 is stored in the HDD 230, read out to the RAM 210, and executed as a job distributing process 221 by the CPU 220.

According to the present invention, since data necessary for distributed processing is arranged in each of the network segments, a network load can be reduced as compared with the technique for transmitting data to all the servers.

Moreover, since the network segment is provided with only data required for the servers in the network segment, the network load can be further reduced.

Furthermore, since data is divided properly according to processing capabilities of the servers, distributed processing can be performed efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus comprising:
   a processor; and
   a memory storing computer-readable instructions, execution of the instructions by the processor facilitates instructing a plurality of servers to execute a distributed processing of a job, execution of the instructions by the processor configuring the apparatus to include:
   a job-request receiving unit to receive a request of executing the job;
   a determining unit to determine a plurality of network segments each of the network segments including a plurality of servers to be involved in the distributed processing of the job, a network being divided into a plurality of network segments;
   a dividing unit to divide job data used for the servers included in the network segments determined by the determining unit into a plurality of sub-data based on a ratio of throughputs of the determined network segments when the job data can be divided into the sub-data for the distributed processing of the received job, and divide the job data into a plurality of sub-data based on a ratio that is closest to the ratio of the throughputs when the job data cannot be divided into the sub-data based on the ratio of the throughputs due to a divisional limitation, the job data being used for the distributed processing of the job, each of the throughputs being a sum of throughputs of all the servers included in each of the network segments;
   a data transmitting unit to transmit each of the sub-data to a data storage unit in a corresponding network segment from among the network segments determined by the determining unit; and
   a transmitting unit to transmit, to each of the servers, a job for each of the servers to execute the distributed processing the received job and information on a place where the data is stored in the data storage unit.

2. A method of an apparatus for instructing a plurality of servers to execute a distributed processing of a job, comprising:
   receiving a request of executing the job;
   determining a plurality of network segments each of the network segments including a plurality of servers to be involved in the distributed processing of the job, a network being divided into a plurality of network segments;
   dividing job data used for the servers included in the network segments determined at the determining into a plurality of sub-data based on a ratio of throughputs of the determined network segments when the job data can be divided into the sub-data for the distributed processing of the received job, and dividing the job data into a plurality of sub-data based on a ratio that is closest to the ratio of the throughputs when the job data cannot be divided into the sub-data based on the ratio of the throughputs due to a divisional limitation, the job data being used for the distributed processing of the job, each of the throughputs being a sum of throughputs of all the servers included in each of the network segments;
   transmitting each of the sub-data to a data storage unit in a corresponding network segment from among the network segments determined at the determining; and
   transmitting, to each of the servers, a job for each of the servers to execute the distributed processing the received job and information on a place where the data is stored in the data storage unit.

3. A non-transitory, computer-readable medium that stores a computer program for instructing a plurality of servers to execute a distributed processing of a job, wherein the computer program causes a computer to execute:
   receiving a request of executing the job;
   determining a plurality of network segments each of the network segments including a plurality of servers to be involved in the distributed processing of the job, a network being divided into a plurality of network segments;
   dividing job data used for the servers included in the network segments determined at the determining into a plurality of sub-data based on a ratio of throughputs of the determined network segments when the job data can be divided into the sub-data for the distributed processing of the received job, and dividing the job data into a plurality of sub-data based on a ratio that is closest to the ratio of the throughputs when the job data cannot be divided into the sub-data based on the ratio of the throughputs due to a divisional limitation, the job data being used for the distributed processing of the job, each of the throughputs being a sum of throughputs of all the servers included in each of the network segments;
   transmitting each of the sub-data to a data storage unit in a corresponding network segment from among the network segments determined at the determining; and
   transmitting, to each of the servers, a job for each of the servers to execute the distributed processing the received job and information on a place where the data is stored in the data storage unit.

* * * * *